B. H. SKELLY.
SWIVEL CONNECTION FOR FORCE FEED LUBRICATORS.
APPLICATION FILED DEC. 19, 1918.
1,317,734.  Patented Oct. 7, 1919.
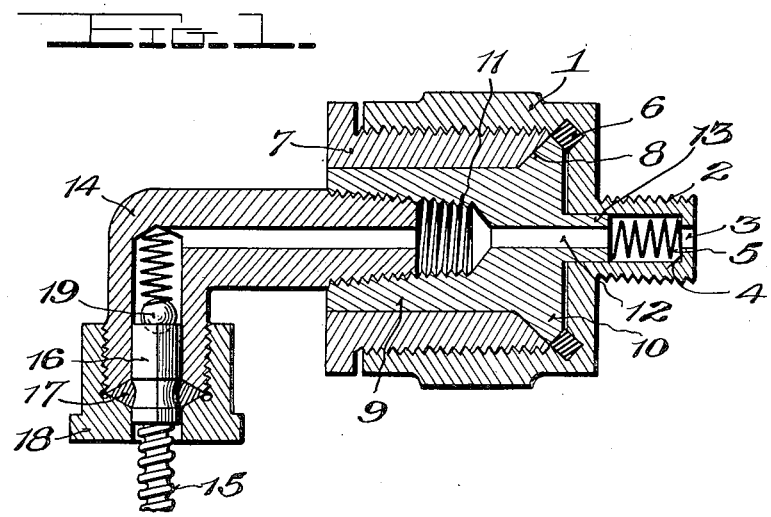
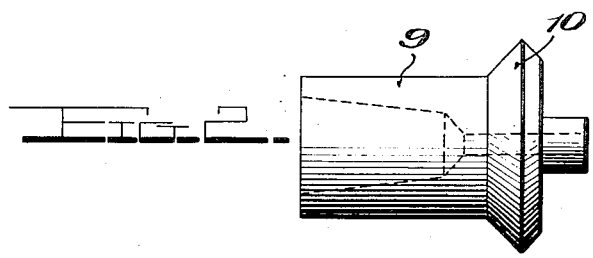
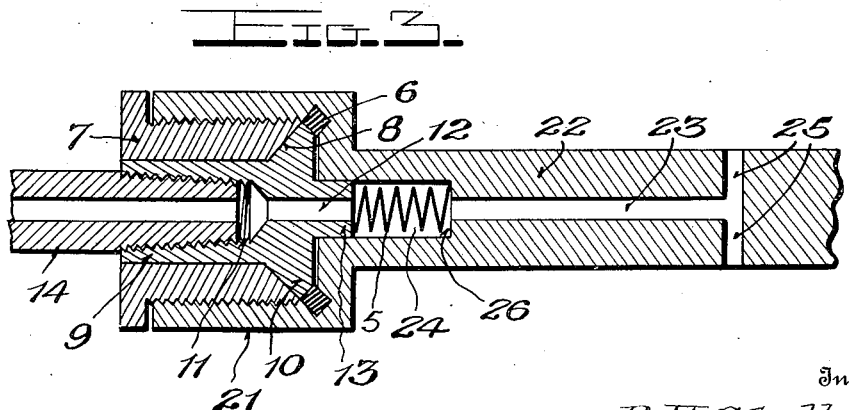
Inventor
B. H. Skelly.
Attorney

UNITED STATES PATENT OFFICE.

BERNARD H. SKELLY, OF BRIDGEPORT, CONNECTICUT.

SWIVEL CONNECTION FOR FORCE-FEED LUBRICATORS.

1,317,734.　　　　　　　Specification of Letters Patent.　　　Patented Oct. 7, 1919.

Application filed December 19, 1918. Serial No. 267,472.

*To all whom it may concern:*

Be it known that I, BERNARD H. SKELLY, a citizen of the United States, residing at the city of Bridgeport, county of Fairfield, State of Connecticut, have invented certain new and useful Improvements in Swivel Connections for Force-Feed Lubricators; and I do declare the following to be a full, clear, and exact description of the invention, such as will enable others skilled in the art to which it appertains to make and use the same.

This invention relates to certain new and useful improvements in a swivel connection especially adapted for force feed lubricating systems of automobiles and other mechanisms subject to much vibration and jar.

In the force feed lubricators employed on automobiles, it has been the custom to rigidly secure, as by solder or otherwise, the small oil-conducting tubes to the cup for the bearing to be lubricated, but owing to the vibration in the machine the tubes often become twisted and broken because of such rigidity of connection.

It is, therefore, the principal object of this invention to provide an improved connection which will obviate these disadvantages, and it consists broadly of a cup or casing substituted for the usual grease cup, and a swivel device secured in the cup to freely turn therein, the oil-conducting tube being then connected to the outer end of the device.

Further, the invention resides in the features of construction and the arrangements and combinations of parts hereinafter described and claimed, reference being made to the accompanying drawing wherein:

Figure 1 is a longitudinal section through the improved swivel;

Fig. 2 is an elevation of the main swivel part; and

Fig. 3 is a longitudinal section through a slightly modified construction.

Referring more in detail to the drawing, the oil cup or plug 1 is provided with a threaded stem 2 whereby it may be screwed into a casing in the place of the usual grease cup, said stem 2 having an oil passage 3 therethrough contracted at its outer end by the annular shoulder 4 on which one end of an expansion coiled spring 5 seats. The interior of the cup or casing is screw threaded and at the base of these threads, in the corner bordering the bottom wall of the cup, is formed a groove to receive and fix a packing ring 6 so that the latter will present a flat annular face extending from the bottom of the cup in an outwardly flaring manner. A hollow sleeve-nut or thimble 7 is engaged with the internal screw threads of the cup and has its bottom edge formed with an inwardly beveled seat 8.

Loose within this sleeve nut 7 so as to turn freely therein is the main swivel part 9 which is more in the nature of a plug having an enlargement or annular flange 10 at its inner end formed with inner and outer beveled faces opposing and fitting between the packing ring 6 and the beveled seat 8. The inner bevel of this base flange 10 is designed to firmly seat against the packing ring when the sleeve nut 7 is screwed into the cup 1 to engage its seat 8 on the outer beveled flange face with which it closely conforms. This beveled seat 8 and the conformation thereof to the outer beveled face of the flange 10 effects the swivel joint.

A screw threaded tapered opening 11 is formed in the outer end of the plug and leads to an axial oil passage 12 that preferably registers with the oil passage 3. The swivel plug is also equipped with a central extension 13 which projects from the base or inner end and is made tubular by reason of the oil passage 12 therethrough. This extension has rotatable and slidable fit within the spring chamber of stem 2 and provides a seat for the adjacent end of the coiled spring in opposing relation to the shoulder 4. Obviously then, the coiled spring functions to keep the outer beveled flange face of plug 9 closely against the beveled seat 8 so that there can be no leakage of oil while at the same time freedom of movement in a swivel manner is afforded.

An elbow 14 is threaded in the tapered opening 11 at the outer end of the swivel plug which tapered thread insures a good tight joint and secured to the opposite end of this elbow is the flexible oil-conducting tube 15. This tube may be soldered or otherwise secured to the elbow, although I have here depicted it as being connected by a novel clamping means constituting the subject matter of another application for patent filed by me.

Briefly, this tube connector may be described as follows: A sectional sleeve 16 of soft metal, such as lead, is preferably formed with a thread cast in it to correspond with the spiral winding of the tube. The sleeve sections are placed around the end of the tube and held operative by an encircling soft brass ring 17 having its opposite faces beveled. A clamping nut 18, previously strung over the tube, is now threaded on the adjacent end of the elbow, said nut and elbow having opposing beveled seats to clamp the double beveled ring 17 therebetween. The pressure of nut 18 on the ring, and indirectly on the sectional sleeve, forces the soft metal into all parts of the joint so as to fill them and thereby render the joint tight and liquid-proof without the use of solder.

Within the elbow 14 is arranged a spring pressed ball valve 19 seating on the sectional sleeve 16 to prevent the oil gravitating from tube 15 into the elbow and bearing except when the oil is placed under pressure.

In Fig. 3 the cup or casing 21 is formed integral with the shaft or spindle 22 but is otherwise identical in construction with the preferred embodiment. The oil passage 23 extends axially in the shaft 22 from the coiled spring chamber 24 and terminates in branch passages 25 leading to the surface to be lubricated. The coiled spring 5 is compressed between a shoulder 26 and central extension 13 of the swivel plug.

In either adaptation a leak-proof, efficient swivel joint is provided in which connection it will be noted that the central extension 13 projects into the hollow stem or spring chamber so as to break joint and further insure against leakage from back pressure. The packing ring provides another tight joint and by reason of the spring a still further leak-tight joint is effected at the beveled seat 8, the nut 7 being adjusted tight enough without producing a binding on the flange or enlargement of the swivel plug.

What I claim is:

1. A swivel connection for lubricating systems, comprising a cup adapted to be screwed into the bearing in the place of the usual grease cup, said cup having an oil passage in its bottom, and a swivel part rotatably secured within the cup and provided with means of connection with an oil conduit.

2. A swivel connection for lubricating systems, comprising an internally screw threaded cup formed with an axial oil passage in its bottom and an internal shoulder therein, a coiled spring arranged within the passage and seating on the shoulder, a packing ring secured in the bottom of the cup so as to present an outwardly flaring seating at the base of the internal screw threads, a sleeve nut engaged with said cup threads and formed at its inner end with a beveled seat, and a swivel plug rotatably fitting the sleeve nut and formed at its inner end with a peripheral flange beveled on opposite sides and extending between the bevel seat on the nut and the packing, in engagement therewith, said plug being connectible with an oil conduit and having a central extension fitting the oil passage of the cup for engagement by the spring.

3. A swivel connection for lubricators comprising a cup having an oil passage in its bottom constituting a spring chamber, an expansible spring arranged in the chamber, a hollow member secured within the cup and formed at its inner end with a beveled seat, and a swivel plug having a base enlargement extending beneath the beveled seat and formed with a beveled face for engagement therewith, said plug also having a bottom extension formed with an oil passage and movably fitting the spring chamber to compress the spring whereby the latter will hold the beveled face of the plug enlargement engaged on said beveled seat.

4. A swivel connection for lubricators comprising a cup having an oil passage in its bottom constituting a spring chamber, an expansible spring arranged in the chamber, a hollow member secured within the cup and formed at its inner end with a beveled seat, a swivel plug having a base enlargement extending beneath the beveled seat and formed with a beveled face for engagement therewith, said plug also having a bottom extension formed with an oil passage and movably fitting the spring chamber to compress the spring whereby the latter will hold the beveled face of the plug enlargement engaged on said beveled seat, the opposite end of the plug being formed with a threaded tapered opening, an elbow engaged in the latter, and valve means within the elbow for controlling the admission of the lubricant to the swivel.

5. A swivel connection for lubricators, comprising a cup, a swivel plug arranged therein and formed on its inner end with a peripheral enlargement, a hollow nut secured in the cup and having its inner end seating on the enlargement whereby the plug may have swivel movement, said plug and cup having oil passages therethrough, means yieldably urging the plug enlargement toward its seat.

6. A swivel connection for lubricators, comprising a cup, a swivel plug arranged therein and formed on its inner end with a peripheral enlargement, a hollow nut secured in the cup and having its inner end seating on the enlargement whereby the plug may have swivel movement, said plug and cup having oil passages therethrough, the opposite end of the plug being formed with a threaded tapered opening, an elbow engaged in the latter, and valve means within the elbow for controlling the admission of the lubricant to the swivel.

7. A swivel connection for lubricators, comprising a cup, a swivel member therein having a peripheral flange, a hollow nut secured in the cup and seating on one face of the flange to permit relative rotation thereof, a packing member interposed between the opposite face of the flange and the bottom of the cup, and means yieldably urging a tight joint between the inner end of the nut and the flange face engaged thereby.

In testimony whereof I affix my signature.

BERNARD H. SKELLY.